Sept. 26, 1933.   T. WISMAN   1,928,345
RADIO TESTING VOLTMETER SWITCH
Filed March 17, 1932   2 Sheets-Sheet 1
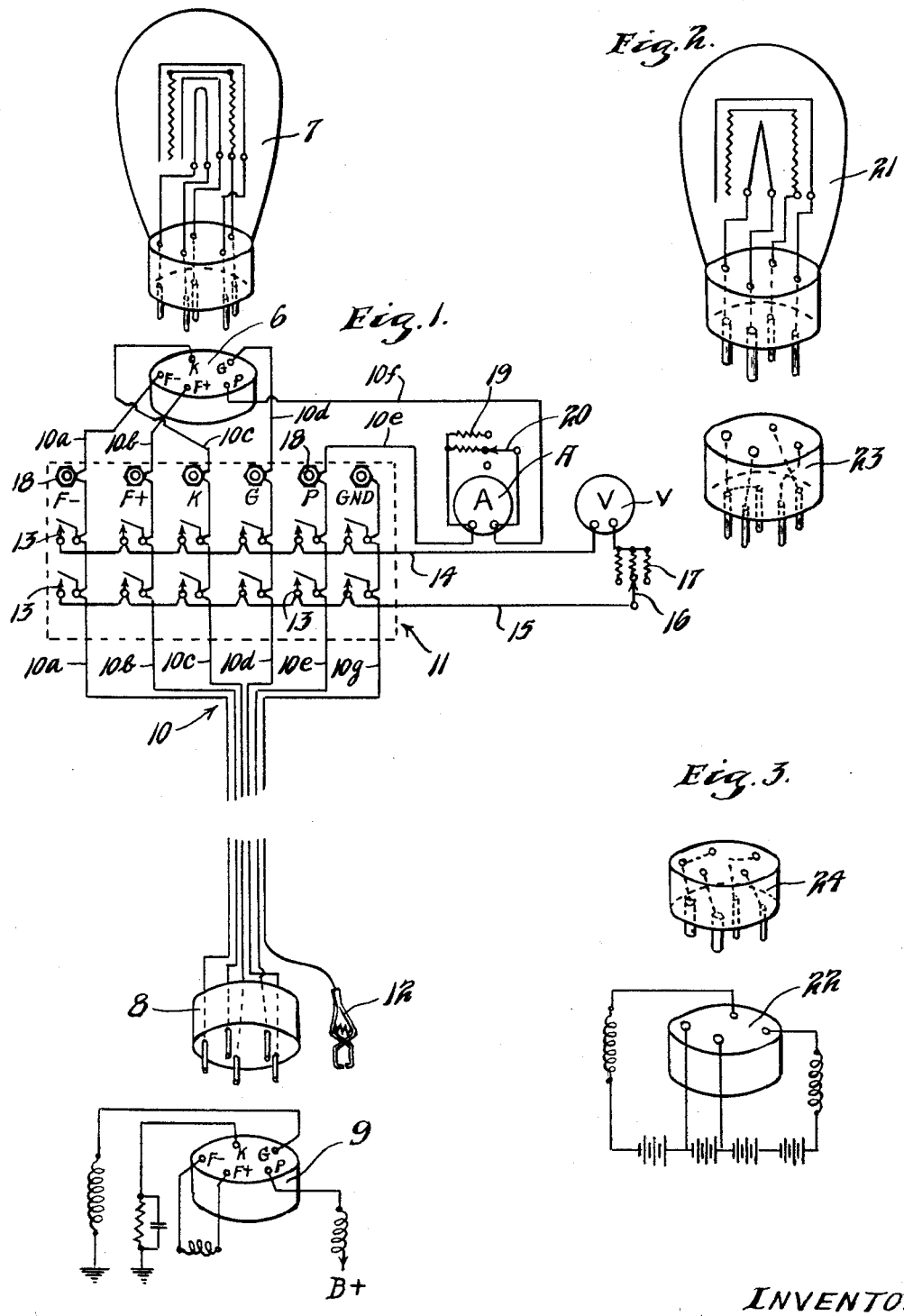
INVENTOR.
THEODORE WISMAN
BY HIS ATTORNEYS.

Sept. 26, 1933.  T. WISMAN  1,928,345
RADIO TESTING VOLTMETER SWITCH
Filed March 17, 1932  2 Sheets-Sheet 2
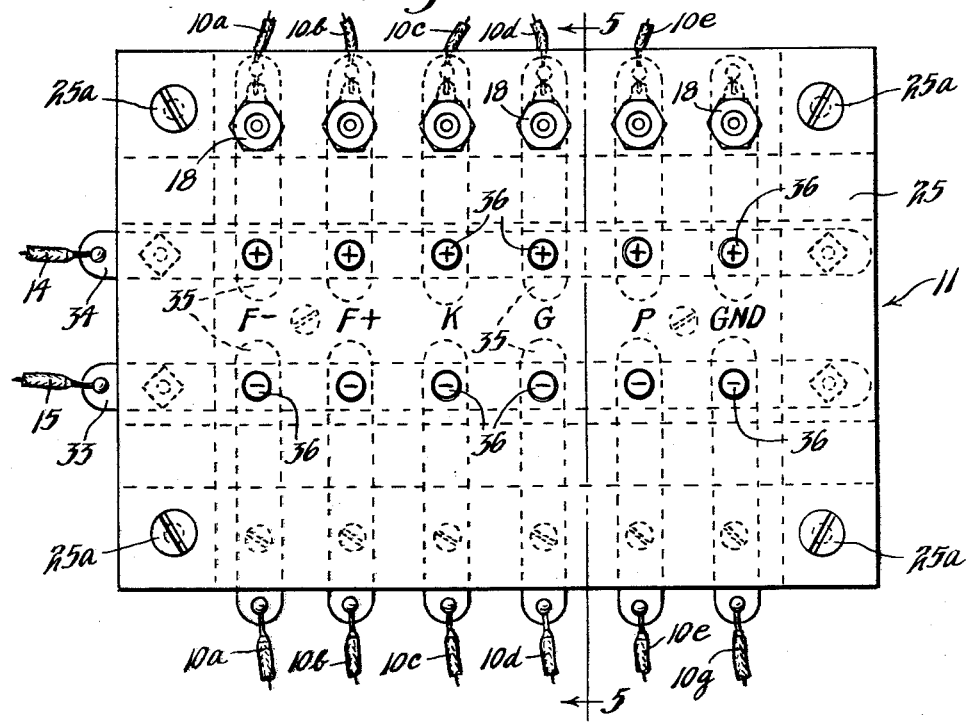
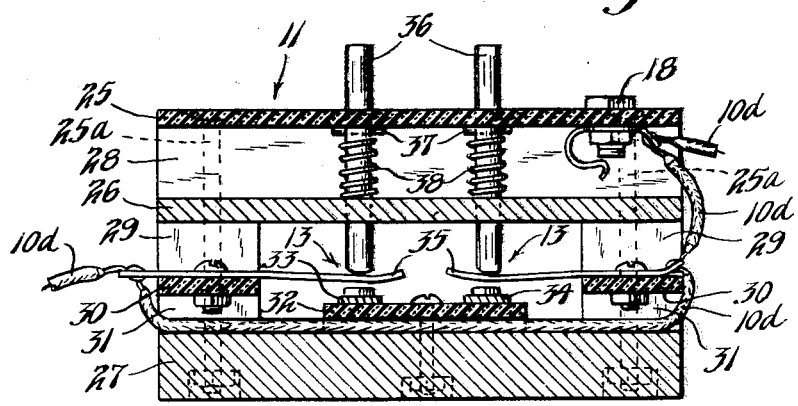
INVENTOR.
THEODORE WISMAN.
BY HIS ATTORNEYS.

UNITED STATES PATENT OFFICE 1,928,345

RADIO TESTING VOLTMETER SWITCH

Theodore Wisman, Minneapolis, Minn.

Application March 17, 1932. Serial No. 599,428

6 Claims. (Cl. 250—20)

My invention relates to equipment for testing radio receivers or other apparatus employing vacuum tubes, and more particularly to equipment for use in obtaining readings of voltages between various conductors in such apparatus.

Most radio receiver analyzers or testers now on the market employ double pole rotary switches or double pole push button switches to successively connect the voltmeters of such testers to each of several definite pairs of vacuum tube socket terminals such as the "grid" and "cathode", "plate" and "cathode" or "negative filament" and "positive filament" terminals. The pairs of socket terminals to which the voltmeter can be connected are limited to the few definite pairs provided for on the rotary switches or push button switches. To provide for cases where the polarity of the potential being read is reversed with respect to normal polarity, many analyzers include an additional switch for reversing the voltmeter connections.

In analyzers incorporating a rotary switch to connect the voltmeter to various pairs of socket terminals, it is often necessary in turning said rotary switch to a position corresponding to a desired connection, to turn said switch through one or more intervening undesired positions, some of which may momentarily connect the voltmeter to higher voltages than the range for which the voltmeter happens to be set. Either an operation of the voltmeter range selecting switch is necessary, or risk of injury to the voltmeter is incurred in a case of this kind. To prevent the described condition, some analyzers incorporate a spring return, normally open, voltmeter key which must be operated in addition to other controls when each reading is taken.

The conventional types of analyzers are not adapted for use in connection with types of vacuum tubes developed subsequent to the manufacture of said analyzers where such tubes require connections differing from the connections required by the types of tubes with which said analyzers were designed to be used.

It is an object of my invention to provide a testing device of the class described, wherein the switching means thereof can be operated to selectively connect a voltmeter included in said device to any two of the several conductors leading to a vacuum tube circuit.

A more detailed object is to provide a testing device of the above described class, wherein the switching means can be selectively operated to connect the positive terminal of a direct current voltmeter to any one of the several terminals of a vacuum tube socket and to connect the negative terminal of said voltmeter to any one of said terminals.

A further object is to provide a testing device of the above described class, wherein the switching means for selecting the conductors to which the voltmeter is connected also performs all of the functions of a spring return, normally open, voltmeter key and a voltmeter reversing switch or button.

Still another object is to provide a testing device of the class described, which can be used without modification thereof in connection with any types of vacuum tubes developed in the future, regardless of the arrangement of connections between the elements and terminals of such tubes providing such tubes do not have a greater number of terminals than the number for which the testing device was built.

A still further object is to provide a testing device of the class described, wherein additional units can be easily added to the switching means thereof in the event that vacuum tubes with a greater number of terminals than now used, are developed.

To these ends, generally stated, the invention consists in the novel parts and novel combinations of parts hereinafter defined in the claims and described in the following specification, made in connection with the accompanying drawings, wherein like reference characters refer to the same or similar parts throughout the various views, and, in which, Fig. 1 is an electrical circuit diagram of my invention, and shown therewith are the connections of a vacuum tube of conventional form and a portion of a radio receiving circuit in which said vacuum tube is normally connected;

Fig. 2 shows a three element vacuum tube having a four prong base, and an adapter for use therewith when said tube is connected to the socket of my testing device;

Fig. 3 shows a portion of a conventional radio receiver circuit in which the vacuum tube of Fig. 2 is normally connected, and an adapter to be used between the plug of my testing device and the four terminal socket shown in association with said circuit;

Fig. 4 is a top view of the switching means employed in my invention; and

Fig. 5 is a section of the switching means taken along the lines of 5—5 of Fig. 4, as indicated by the arrows.

Referring to the drawings, a socket 6, adapted to receive the prongs on the base of a five prong vacuum tube 7, and a plug 8, adapted to be inserted in a five terminal vacuum tube socket, are connected together by means of electrical wires 10 and a switching device 11. The vacuum tube 7 in normal operation thereof is inserted in the socket 9 of the radio receiver circuit with which it is associated. The wires 10a, 10b, 10c, 10d, 10e, and 10f of my testing device are connected between the terminals of the socket 6 and corresponding terminals of the plug 8 through the switching device 11 so that, when the plug 8 is inserted in the socket 9 of the radio receiver and the tube 7 is inserted in the socket 6 of my testing device, the several elements of the tube 7 are connected through the socket 6, said wires, and the socket 9 to the same conductors of the radio receiver as when in normal operation. Between the switching device 11 and the plug 8, the wires 10 are in the form of a multi-conductor cable. A wire 10g is attached, at the end adjacent the plug 8, to a test clip 12. Each of the wires 10a, 10b, 10c, 10d, 10e, and 10g is connected to one terminal of each one of a pair of push buttons 13 mounted in switching device 11. The second terminal of one push button of said pair is connected to a bus wire 14 and the remaining terminal of the other push button of the pair is connected to a bus wire 15. The bus wire 14 is connected to one terminal of a voltmeter V. The bus wire 15 is connected to the movable contact of a rotary switch 16 and each of the stationary contacts of said switch is connected to one of the multipliers 17. The opposite ends of said multipliers are connected to the second terminal of said voltmeter. Any one of the three multipliers provided may be connected in the circuit to the voltmeter by setting the movable arm of the switch 16 on the stationary contact connected to the desired multiplier. Each of the wires 10a, 10b, 10c, 10d, 10e and 10g is also connected to a tip jack 18. The wire 10e is connected to the positive terminal of a milliammeter A and the negative terminal of said milliammeter is connected through a wire 10f to the "plate" terminal of the socket 6, which may have the letter P printed thereon adjacent to said terminal, as shown. To said milliammeter terminals are connected the shunts 19 and the rotary switch 20, as shown. In one position, the movable contact of the switch 20 will be engaged with a stationary contact to which no connections have been made, and in each of the other two positions said movable contact will be engaged respectively with one of two stationary contacts to which the respective shunts 19 are connected.

An adapter 23 has five prongs adapted for insertion in the socket 6 and a socket portion adapted to receive the prongs of a four prong tube such as the tube 21. An adapter 24 has four prongs adapted for insertion in a four terminal socket such as the socket 22 and a five prong socket portion adapted to receive the prongs of the plug 8. In both of the above described adapters, the cathode and negative filament circuits of the five prong portion thereof are both connected to the negative filament terminal of the four prong portion thereof.

In battery operated radio receivers and some alternating current operated receivers, vacuum tubes such as the tube 21, having four prong bases and corresponding four terminal vacuum tube sockets such as the socket 22, are used. When my testing device is used in connection with such receivers, the pronged end of the adapter 23 is inserted in the vacuum tube socket 6 and the vacuum tube 21 is inserted in the socket portion of the adapter 23. Also the pronged end of the adapter 24 is inserted in the socket 22 of the radio receiver and the plug 8 is inserted in the socket portion of the adapter 24.

The switching device 11 has a rectangular upper plate 25, a rectangular middle plate 26, and a rectangular lower plate 27, all three of said plates being similar in width and length and at least the upper plate preferably being made of bakelite or other suitable insulating material. A spacing block 28 is located between the end portions of upper plate 25 and the middle plate 26 at each end thereof and a spacing block 29 is located immediately below the middle plate at each corner portion thereof. A contact carrying strip 30, substantially equal in length to the middle plate 26 and made of bakelite or other suitable insulating material, extends the length of each long side of said switching device and the ends thereof are disposed immediately below the spacing blocks 29. A spacing block 31 is located below each end of each of said contact carrying strips 30 and above each corner portion of the lower plate 27. Bolts 25a, passing through apertures in the four corners of the upper plate 25, pass through apertures in the spacing blocks 28, the corner portions of the middle plate 26, the spacing blocks 29, the end portions of the contact carrying strips 30, the spacing blocks 31, and the corner portions of the lower plate 27, said bolts acting to clamp said plates and spacing blocks together.

A narrow plate 32, made of bakelite or other suitable insulating material, is secured to the upper surface of the lower plate 27 in parallel relation thereto and extending through the length thereof, the longitudinal center line of said narrow plate being disposed along the longitudinal center line of said lower plate. Two parallel metal contact bars 33 and 34 are longitudinally disposed in spaced relation to each other along the upper surface of the narrow plate 32 and are secured thereto.

Secured to one of the contact carrying strips 30 are six uniformly spaced inwardly projecting flat contact fingers 35 formed of resilient metal and positioned to make contact at their free ends with the nearest one of the two contact bars 33 and 34 when said free ends are pressed downward, and to leave contact with said bars when released. Similarly secured to the remaining one of said contact carrying strips are six other contact fingers 35 disposed directly opposite the contact fingers associated with the first mentioned one of the contact carrying strips and positioned to make contact at their free ends with the remaining one of the two contact bars in a manner similar to that above described.

Directly above the free end of each contact finger an aperture is provided in the middle plate 26 and a second aperture, alined with the first, is provided in the upper plate 25. A plunger 36, formed of bakelite or other suitable insulating material, is slidably retained in each alined pair of apertures, each of said plungers extending from the upper side of one of the contact fingers 35 through said apertures to a point somewhat above the upper surface of the upper plate 25. Immediately below said plate, each of said plungers is provided with a transverse pin 37 to limit the upward movement of said plungers. Between said pin and the upper surface of the middle plate 26, a spiral compression spring 38 is coiled about each one of the plungers 36, said springs being adapted to resistively permit downward motion of said plungers when downward pressure is exerted on the upper ends of said plungers, and to return said plungers to the uppermost limit of their motion when said pressure is removed.

A row of six tip jacks 18 are mounted in apertures in the upper plate 25, the location of said row being near and parallel to one of the long sides of said top plate, and the individual tip jacks being alined with the previously described plungers 36.

The wire 10d, as shown in Fig. 4, is connected to each one of an opposing pair of contact fingers and to the tip jack alined with the plungers associated with said pair of contact fingers. Each one of the remaining wires 10a, 10b, 10c, 10e and 10g is similarly connected to each one of an opposing pair of contact fingers and to a tip jack corresponding thereto.

The contact bar 34 is connected to the positive terminal of the direct current voltmeter V by means of a wire 14 and the contact bar 33 is connected to the negative terminal of said voltmeter through the wire 15 and the rotary switch and multiplier previously described. On the upper surface of the upper plate 25 between the two plungers associated with each oposing pair of contact fingers is an engraved or stamped letter or letters designating the wire, or circuit, to which said pair of contact fingers is connected. The negative and positive filament circuits are designated respectively by "F—" and "F+", the cathode circuit by K, the grid circuit by G, the plate circuit by "P", and the "ground" circuit by "GND". The top of each plunger in the row associated with the contact bar 33 is marked "—" to indicate that it is associated with the negative terminal of the voltmeter and the top of each plunger in the other row is marked "+" to indicate that it is associated with the positive terminal of the voltmeter.

Operation

In testing a radio receiver or other device employing vacuum tubes, my testing device is connected to one vacuum tube and one receiver socket at a time. To test the circuits associated with the vacuum tube 7, for example, said tube is removed from the socket 9, in which it is normally used, and is placed in the socket 6 of my testing device, and the plug 8 of my testing device is inserted in the socket 9. The test clip 12 is engaged with some part of the metal chassis of said radio receiver. The tube 7 is now connected through the circuits of my testing device to the radio receiver circuit with which it is normally associated. If, for example, it is desired to read the plate voltage, the plunger marked "—" and located adjacent the letter "K" and the plunger marked "+" and located adjacent the letter "P" are pressed downward. Each one of said plungers moves downward against the pressure of a spring 38 and pushes the contact finger 35 below the same downward into contact with the one of the contact bars 33 and 34 with which said finger is associated. The above described operation connects the cathode circuit to the contact bar 33 which is connected to the negative terminal of the voltmeter V and connects the plate circuit to the contact bar 34 which is connected to the positive terminal of said voltmeter. It is obvious that the voltmeter will then indicate the voltage between the "plate" circuit and the "cathode" circuit, said voltage commonly being referred to as the "plate voltage". Similarly, the other voltages associated with the particular vacuum tube circuit under test may be read on the voltmeter by depressing proper plungers 36. When the two plungers depressed for the purpose of obtaining a reading are released, said plungers are raised by the springs 38 and the outer ends of the contact fingers 35 rise due to the resiliency thereof. It is obvious that readings of voltages between any one of the circuits to the vacuum tube and the chassis of the radio receiver may be obtained. This is of advantage in analyzing trouble in radio receivers. For example, if the grid bias resister, connected between the cathode of a tube and the chassis or "ground", has become open circuited, the plate voltage reading, obtained as previously described, will be zero, but a reading taken between the plate circuit and ground will indicate normal plate voltage plus normal grid bias voltage, thus indicating the existence of an open circuit in said resister.

In testing battery operated receivers, it is sometimes found that the polarity of the potential existing between the filament terminals of the vacuum tube socket is the reverse of normal. In such a case, in using my testing device to obtain a reading of the filament voltage, the plunger associated with the negative filament circuit and the positive voltmeter terminal, and the plunger associated with the positive filament circuit and the negative voltmeter terminal would be depressed, thus giving a correct voltmeter reading without the need of a voltmeter reversing switch.

It will be seen that the number of pairs of contact fingers and associated plungers may be increased to provide for testing of vacuum tubes and associated circuits having a greater number of elements than those described herein as, for example, the screen grid tube having a connection cap on the top thereof, the radio frequency pentode tube having a connection terminal on the side of its base, and other tubes not yet developed.

It is apparent that I have invented a new and useful device for testing radio receivers and other equipment employing vacuum tubes, said device being very simple and yet having great flexibility of application. It is obvious that my device represents considerable improvement over present types of radio receiver testing devices in that it provides for rapidly obtaining readings of voltages existing between any two vacuum tube terminals rather than only between fixed pairs of terminals, in that it inherently provides for the functions of a voltmeter reversing switch and a voltmeter key, in that it provides for obtaining any desired reading immediately without the need of operating a control through any undesired positions before establishing the desired connections, and in that it provides for testing of circuits involving yet undeveloped types of vacuum tubes in which the connections may differ from those now in use.

It is obvious that my device can be used not only for testing of radio receivers but also for testing of other equipment employing vacuum tubes such as public address systems, talking motion picture equipment, television apparatus, photoelectric equipment, and the like.

It will, of course, be understood that various changes may be made in the form, details, arrangement and proportions of the various parts without departure from the scope of the present invention.

What is claimed is:—

1. In testing equipment for vacuum tube circuits, a voltmeter, a socket adapted to receive the base of a vacuum tube, a connection plug adapted to be inserted in a vacuum tube socket, electrical conductors respectively connecting the various terminals of said socket to the corresponding terminals of said plug, and a pair of electrical contact making means associated with each conductor, each of said contact making means being independently operable and having two terminals, one terminal of each means of each pair being connected to the conductor with which the particular pair is associated, the remaining terminal of one means of each pair being connected to one terminal of said voltmeter, and the remaining terminal of the other one of the means of each pair being connected to the other terminal of said voltmeter.

2. In testing equipment for vacuum tube circuits, a voltmeter, a pair of buses, a socket adapted to receive the base of a vacuum tube, a connection plug adapted to be inserted in a vacuum tube socket, an electrical conductor connecting each terminal of said socket to the corresponding terminal of said plug, a pair of electrical contact making means associated with each one of said conductors, each of said means being independently operable and having two terminals, one terminal of each of said means being connected with said conductor, the remaining terminal of one of said means being connected to one of said pair of buses, the remaining terminal of the other one of said means being connected to the other of said pair of buses, said buses being respectively connected to the respective terminals of said voltmeter.

3. In testing equipment for vacuum tube circuits, a voltmeter, a socket adapted to receive the base of a vacuum tube, a connection plug adapted to be inserted in a vacuum tube socket, electrical conductors respectively connecting the various terminals of said socket to the corresponding terminals of said plug, a pair of contacts connected to each conductor, a conductor connected to one terminal of said voltmeter, a conductor connected to the other terminal of said voltmeter, means for selectively and independently engaging one contact of each pair with one of said two last mentioned conductors, and means for selectively and independently engaging the other contact of each pair with the other of said two last mentioned conductors.

4. An apparatus adapted for use in testing vacuum tube circuits, comprising two buses, a plurality of resilient contacts for each bus mounted to be resistingly pressed into electrical engagement therewith, the respective contacts for one bus being electrically connected with respective contacts for the other bus to form interconnected pairs of contacts, said pairs being adapted for connection with vacuum tube circuits, said buses being adapted for connection to an electrical measuring instrument, and each one of the several contacts being selectively and independently operable.

5. The structure defined in claim 4, and a plurality of spring pressed means each capable of movement independently of the others against the tension of its spring for movement of one of said contacts into electrical engagement with the corresponding one of said buses.

6. In testing equipment for vacuum tube circuits, a voltmeter, a connection plug adapted to be inserted in a vacuum tube socket, an electrical conductor connected to each terminal of said plug, a plurality of normally open independently operable electrical contact making means, one of said means being connected between each of said conductors and one terminal of said voltmeter, and a second one of said means being connected between each of said conductors and the remaining terminal of said voltmeter.

THEODORE WISMAN.